United States Patent
Higgins

(10) Patent No.: US 7,343,005 B2
(45) Date of Patent: Mar. 11, 2008

(54) METHOD AND APPARATUS FOR VOICE-OVER IP SERVICES TRIGGERED BY OFF-HOOK EVENT

(75) Inventor: Richard Higgins, Colorado Springs, CO (US)

(73) Assignee: Time Warner Cable, a division of Time Warner Entertainment Company, L.P., Stamford, CT (US)

( * ) Notice: Subject to any disclaimer, the term of this patent is extended or adjusted under 35 U.S.C. 154(b) by 966 days.

(21) Appl. No.: 10/157,655

(22) Filed: May 29, 2002

(65) Prior Publication Data

US 2003/0223403 A1 Dec. 4, 2003

(51) Int. Cl.
*H04M 11/00* (2006.01)

(52) U.S. Cl. ............... 379/93.12; 379/88.17; 379/114.13

(58) Field of Classification Search ......... 379/88.03, 379/88.17, 114.13
See application file for complete search history.

(56) References Cited

U.S. PATENT DOCUMENTS

| | | | | |
|---|---|---|---|---|
| 5,576,951 A | * | 11/1996 | Lockwood | .................. 705/27 |
| 5,873,068 A | | 2/1999 | Beaumont et al. | |
| 5,883,940 A | | 3/1999 | Thornton | |
| 5,915,001 A | | 6/1999 | Uppaluru | |
| 5,918,213 A | | 6/1999 | Bernard et al. | |
| 5,970,124 A | | 10/1999 | Csaszar et al. | |
| 6,097,792 A | | 8/2000 | Thornton | |
| 6,144,848 A | | 11/2000 | Walsh et al. | |
| 6,157,705 A | | 12/2000 | Perrone | |
| 6,167,118 A | * | 12/2000 | Slivensky | ............... 379/88.03 |
| 6,216,111 B1 | * | 4/2001 | Walker et al. | ............... 705/14 |
| 6,292,480 B1 | | 9/2001 | May | |
| 6,292,675 B1 | * | 9/2001 | Nilsson | .................. 455/563 |
| 6,298,330 B1 | | 10/2001 | Gardenswartz et al. | |
| 6,332,154 B2 | | 12/2001 | Beck et al. | |
| 6,385,584 B1 | * | 5/2002 | McAllister et al. | ......... 704/275 |
| 6,404,876 B1 | * | 6/2002 | Smith et al. | .......... 379/218.01 |
| 6,466,651 B1 | * | 10/2002 | Dailey | ......................... 379/37 |
| 6,512,818 B1 | * | 1/2003 | Donovan et al. | ........ 379/88.18 |

(Continued)

*Primary Examiner*—Fan Tsang
*Assistant Examiner*—Simon Sing
(74) *Attorney, Agent, or Firm*—Roberts, Mardula & Wertheim, LLC

(57) ABSTRACT

The present invention is drawn to a method and apparatus for taking advantage of the always-on nature of a broadband VoIP network connection to provide enhanced services triggered by the off-hook event, bypassing a dial tone. In use, a caller triggers a network based greeting upon the off-hook event of picking up the phone. The greeting can be used for unique branding purposes by speaking a greeting to the caller. After the greeting, the caller can be immediately connected to an array of network-based services. A voice recognition system is employed to permit the caller to use voice dialing. A network interactive voice response unit (VRU) is used with the voice recognition system to allow the user to access services from a menu. The VRU can respond to an affirmative statement from the caller by using a table to lookup the phone number of requested services closest to the caller based on the caller's phone number (i.e., ANI). The VRU can additionally collect purchase and/or billing information from the caller and electronically place an order with the vendor, such as via facsimile, e-mail, web form, or other electronic means. The product or service is then delivered directly to the caller with minimal or no human intervention.

17 Claims, 2 Drawing Sheets

U.S. PATENT DOCUMENTS

| | | |
|---|---|---|
| 6,570,855 B1 * | 5/2003 | Kung et al. ................. 370/237 |
| 6,628,770 B1 * | 9/2003 | Jain et al. ............... 379/207.14 |
| 6,999,564 B1 * | 2/2006 | Thomas ................... 379/88.03 |
| 7,027,398 B2 * | 4/2006 | Fang .......................... 370/235 |
| 2002/0126813 A1 * | 9/2002 | Partovi et al. ......... 379/114.12 |

* cited by examiner

METHOD AND APPARATUS FOR VOICE-OVER IP SERVICES TRIGGERED BY OFF-HOOK EVENT

BACKGROUND OF THE INVENTION

The standard packet switched telephone network (PSTN), sometimes referred to as the plain old telephone system (POTS), has been used for years by consumers to access services, such as ordering pizza. Telemarketers have also used the PSTN as a marketing medium. Over time, the PSTN has been highly optimized for the delivery of voice services only, without regard to the integration of voice and data. Because of limitations in the traditional PSTN architecture, there are fundamental problems with attempting to offer anything other than standard dial tone. Branding and differentiated services become virtually impossible.

Consumers who wanted to talk to someone or who desired services either needed to dial the phone number directly or needed to dial directory assistance. As voice recognition technology developed, it was applied to use for "voice dialing," but still employed use of the dial tone.

In recent years, new technologies have transformed available service and marketing channels. Automatic or interactive voice response (AVR or IVR) systems now allow more cost-effective delivery of messages. Additionally, the use of Voice over Internet Protocol (VoIP) has increased as network bandwidth has increased.

At the same time, a number of marketing and advertising tools have come into play as a result of Internet technology. This marketing processing involves processing consumer requests for information and serving ads to consumers for various services. These marketing and advertising analysis activities have not penetrated significantly into the interactive VRU marketplace.

In U.S. Pat. No. 6,292,480 to May, an electronic communication manager in the form of an advanced virtual assistant uses various technologies, including VoIP, automatic speech recognition, and text-to-speech, to provide an IVR system via telephone and data networks.

U.S. Pat. No. 5,918,213 to Bernard, et al. discloses an automated product purchasing system allows purchasers to order products via a remote communications medium without having to speak to a sales representative or other human operator. According to the invention, purchasers access the automated product purchasing system and browse among the selections offered. Menu style prompts guide the customer through the various products offered by the automated product purchasing system. Product descriptions are provided to assist the customer in making his or her selections. Where appropriate, product samples are provided to the customer via the communications medium so the customer can evaluate the product prior to purchasing. Examples of product samples include movie previews, sample cuts from music tracks, software demos, and the like. Ordering and purchasing are automated so that human operators are not required to intervene in the process. The use of a membership profile with important customer information facilitates the automation of the process and minimizes the amount of times a repeat customer needs to provide this information.

U.S. Pat. No. 5,970,124 to Csaszar, et al. discloses a system wherein a consumer initiates activity by calling an IVR system. Software identifies the consumer a consumer inputted identification and plays an advertising message that, preferably, has been predetermined to have likely appeal to the consumer. The IVR system is then used to disseminate information sought by the customer (such as student grades) after first disseminating the advertising message. The advertising message can include an offer to purchase a product or service. The offer can be taken during the advertising period and recorded so as to be sent to a sponsor.

As noted above this type of targeted advertising has also increased due to advancements in information processing and Internet data mining.

U.S. Pat. No. 6,298,330 to Gardenswartz, et al. discloses delivering a targeted advertisement to a computer in response to receiving an identifier, such as a cookie, from the computer. The targeted advertisement is based on the observed offline purchase history of a consumer associated with the identifier, wherein the targeted advertisements sent to consumers may be changed and/or refined based on changes in consumers' purchase history behaviors.

U.S. Pat. No. 5,873,068 to Beaumont, et al. discloses a marketing system for use in a public switched telephone system having stored program controlled switches connected to customer premise equipment having an analog display service interface, comprises a storage device for storing predetermined information respecting each of customer premise equipment, a device for assembling and managing messages including creating a message to be delivered to one or more of the customer premise equipment, linking each message with one or more of the customer premise equipment, scheduling the delivery of the messages at a predetermined time, and measuring the response of each customer premise equipment to messages delivered thereto.

U.S. Pat. Nos. 6,097,792 and 5,883,940 to Thornton disclose an interactive method and apparatus for the generation of leads that stores a plurality of prerecorded messages. The system accepts user's phone calls and captures the user's phone number, combines it with additional information and tracks users transactions with the system and subsequently transfers the combined information in the form of a sales lead to a prospective seller immediately upon termination of the phone call or beginning prior thereto.

U.S. Pat. No. 6,332,154 to Beck, et a. discloses a client-specific self-help wizard for active clients in a multimedia call center (MMCC) operating through an operating system. The wizard is updated periodically with information related to client transaction history with the MMCC. A connected client is presented by the wizard with a selective media function through which the client may a select a media type for interaction and help, and the MMCC will then re-contact the client through the selected media. The client, for example, may select IP or COST telephony, and the MMCC will place a call to the client to a number or IP address listed for the client, and interactivity will then be through an interactive voice response unit. Help information specific to a client is updated in the client's wizard periodically according to ongoing transaction history with the MMCC. The wizard may also monitor client activity with the wizard and make reports available to various persons.

U.S. Pat. No. 5,915,001 to Uppalura discloses universal access to voice-based documents containing information formatted using MIME and HTML standards using customized extensions for voice information access and navigation. These voice documents are linked using HTML hyper-links that are accessible to subscribers using voice commands, touch-tone inputs and other selection means. These voice documents and components in them are addressable using HTML anchors embedding HTML universal resource locators (URLs) rendering them universally accessible over the Internet. This collection of connected documents forms a voice web. The voice web includes subscriber-specific documents including speech training files for speaker dependent speech recognition, voice print files for authenticating the identity of a user and personal preference and attribute files for customizing other aspects of the system in accordance with a specific subscriber.

U.S. Pat. No. 6,157,705 to Perrone discloses a method for controlling a server using voice. In one embodiment, a client such as a Web browser is coupled over a data communication channel to a server. A telephone at the client side is connected to an interactive voice response (IVR) system that has a speech recognizer at the server side, over a separate, parallel voice communication channel. The IVR system has a control connection to the server. A table of associations between resource identifiers and network addresses is stored in association with the IVR system. A user at the client side establishes a data connection between the client and the server, and a voice connection between the telephone and the IVR system. Control software on the IVR system synchronizes an IVR session to a server session. The control software receives a spoken utterance over the voice communication channel, interprets the utterance to recognize a resource identifier in the utterance, and associates the resource identifier with a network address of a server resource. The IVR system commands the server to deliver the server resource identified by that network address to the client. Thus, the server delivers server resources in response to voice commands at the client side. In an alternate embodiment, the voice communication channel is integrated with the data communication channel.

U.S. Pat. No. 6,144,848 to Walsh, et al. discloses an interactive bi-directional telecommunication method using a handheld low power user device to access a host computer server along a telecommunication path, and to command the host computer server to transmit audio and/or visual reports to the user device. The system includes host computer ordering of consumer products and services using the telecommunications method and handheld low power user device.

What would be useful is a method and apparatus for taking advantage of the "always-on" nature of a broadband VoIP network connection to provide enhanced services triggered by the off-hook event, bypassing a dial tone and the architectural limitations of the PSTN. Such a service would also take advantage of providing advertising keyed to the request and interests of the user as determined by the VoIP and associated VRU capabilities.

BRIEF SUMMARY OF THE INVENTION

The present invention is a system and method for receiving a voice request from a user in a VoIP mode and interpreting that request as a request for goods and services.

The system of the present invention then provides the user with offers for goods and services that are stored in a database of offers.

It is therefore an object of the present invention to provide an alternative to standard dial tone that enables VoIP service providers to differentiate and customize their services.

It is another object of the present invention to enable VoIP service providers to increase brand recognition and value through VRU messages.

It is yet another object of the present invention to leverage the "always on" nature of broadband VoIP service to enable immediate voice-enabled services and applications.

It is further object of the present invention to leverage ownership/control of a broadband network's VoIP services to collect both telephony service fees from subscribers and advertising fees from vendors.

It is another object of the present invention to leverage ownership/control of a broadband network's VoIP services to enhance subscriber telephony services with interactive VRU services and enhance vendor advertising with automatic connection and electronic ordering services.

It is a further object of the present invention to simultaneously increase network branding while reducing caller effort by eliminating the dial tone and providing immediate access to VRU services.

It is yet another objective of the present invention to provide a way for merchants and service providers to have offers made to users based upon the interpreted voice of a user who is asking for goods and services.

The voice port of a VoIP-enabled device, such as a cable modem connected to a broadband network, is always connected to the network, unlike traditional POTS phones that require dialing prior to meaningful connectivity. The present invention is a method and apparatus for taking advantage of the always-on nature of a broadband VoIP network connection to provide enhanced services triggered by the off-hook event, bypassing a dial tone.

In use, a caller triggers a network based greeting upon the off-hook event of picking up the phone. The greeting can be used for unique branding purposes by speaking a greeting to the caller, such as "Welcome to Linerunner service from Time Warner Cable." After the greeting, the caller can be immediately connected to an array of network-based services.

A voice recognition system is employed to permit the caller to use voice dialing. A network interactive voice response unit (NIVRU) is used with the voice recognition system to allow the user to access services from a menu. For example, the caller can pick up the phone of the present invention and, after the greeting, simply state: "I want a pizza." The VRU is programmed is programmed and respond to this request with a targeted advertisement, such as "XYZ Pizza is having a special on 2 medium, 2-topping pizzas for $14.99. Shall I connect you?"

A voice recognition system is employed to permit the caller to use voice dialing. A network interactive voice response unit (NIVRU) is used with the voice recognition system to allow the user to access services from a menu. For example, the caller can pick up the phone of the present invention and, after the greeting, simply state: "I want a pizza." The VRU is programmed to respond to this request with a targeted advertisement, such as "XYZ Pizza is having a special on 2 medium, 2-topping pizzas for $14.99. Shall I connect you⇔"

In a basic embodiment, the VRU can respond to an affirmative statement from the caller by using a table to lookup the phone number of the XYZ outlet closest to the caller based on the caller's phone number (i.e., ANI). In a slightly more complex embodiment, the VRU can collect purchase and/or billing information from the caller and electronically place an order with the vendor, such as via facsimile, e-mail, web form, or other electronic means. The product or services, which in this case is the pizza, is then delivered directly to the caller with minimal or no human intervention. In addition, the system can collect offers from merchants and service providers for goods and services and serve those offers to users based on the request made.

DETAILED DESCRIPTION OF THE INVENTION

Figure 1:
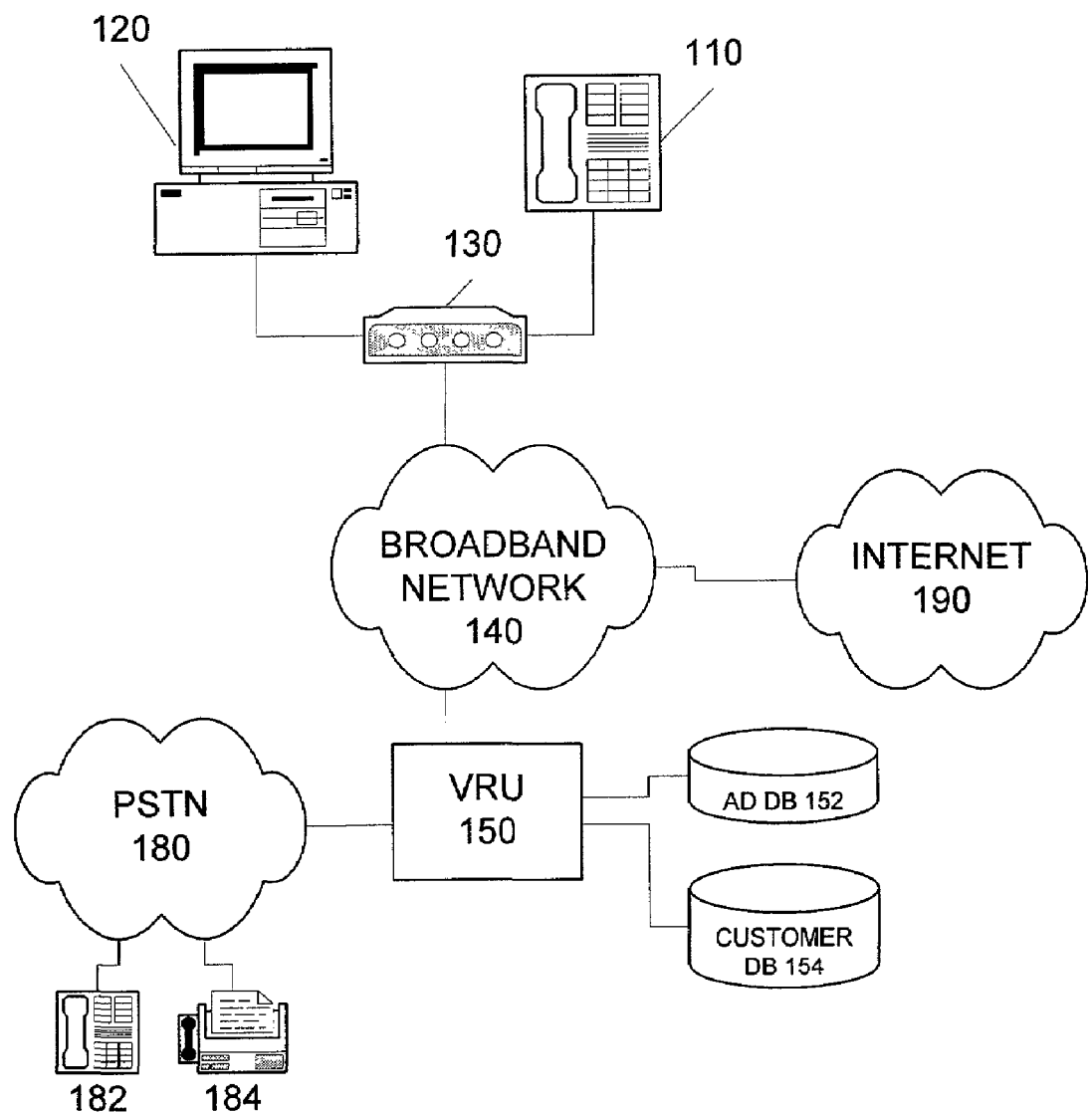
FIG. 1 illustrates a basic schematic diagram of the present invention.

FIG. 1 illustrates a basic embodiment of the present invention, wherein a network interactive voice response unit (VRU) 150 is employed on the broadband network 140, such as a cable network, used to connect network subscriber computers 120 to the Internet 190 via a broadband modem 130, such as a cable modem.

A telephone 110 is connected to the always-on voice port of the modem 130 to provide voice over IP (VoIP) services to the broadband network 140 subscriber. Services include the ordinary connection to other telephones over the PSTN, but additionally include enhanced services provided by VRU 150. As described in more detail below, these services include the presentation of targeted offers from a vendor advertisement database 152. The VRU 150 can also employ a customer (i.e., subscriber) database 154 to assist in targeting the offers to the customer and to assist the network interactive VRU 150 in completing transactions. Examples include, but are not limited to, the VRU 150 obtaining payment information and delivery address information from the customer database 154 so as to complete a requested transaction for the subscriber. The customer database can also include a set of telephone numbers associated with names for use in completing voice dial requests, such as "call mom," "call Bob Smith," or "call work."

Figure 2:
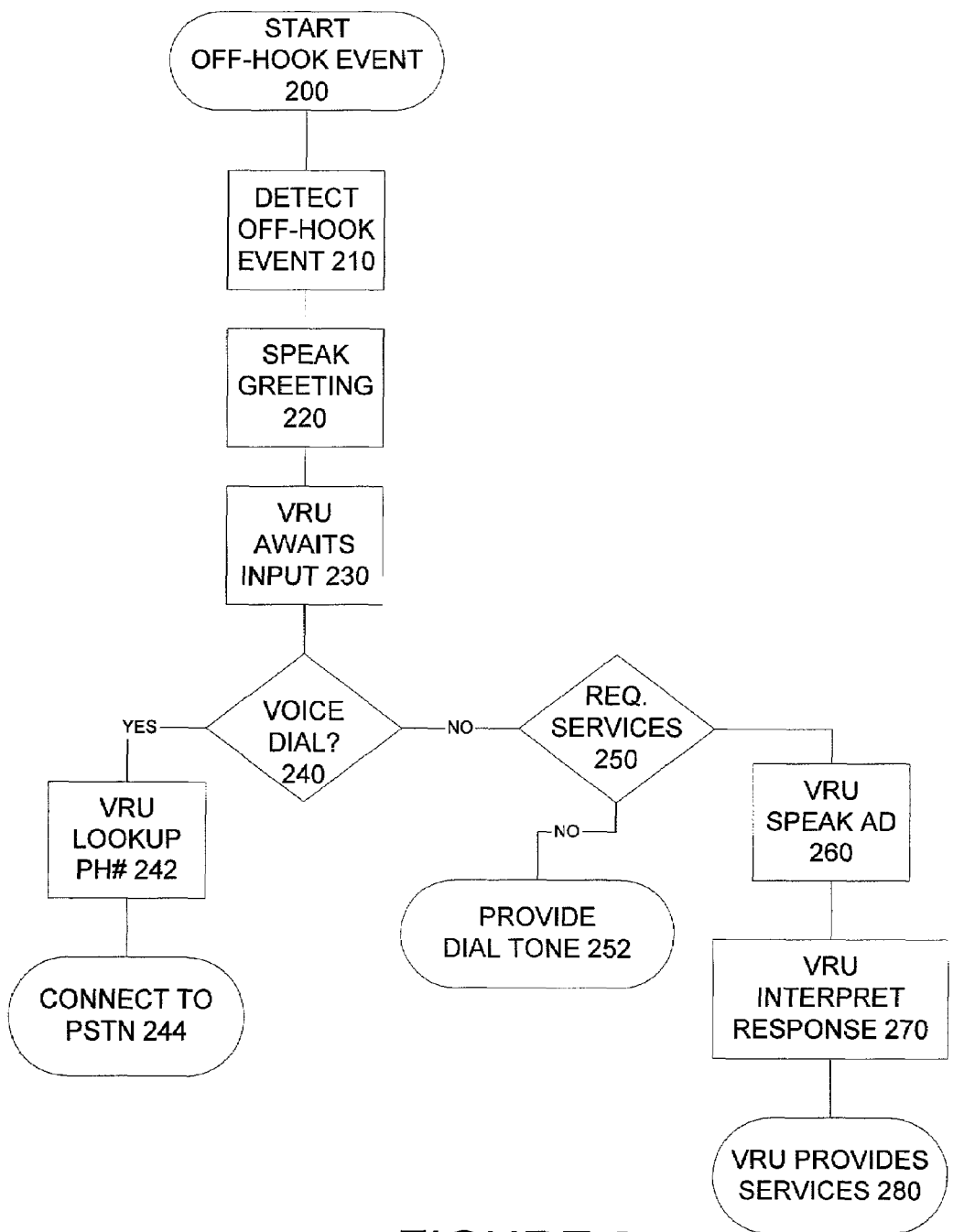
FIG. 2 illustrates a basic flow chart of the method of the present invention.

As is seen in FIG. 2, the process of the present invention leverages the always-on nature of the broadband network connection. The process is initiated by the off-hook event 200 of the subscriber picking up the telephone receiver. Instead of the ordinary dial tone and the traditional need to dial a number to access any VRU-type services, the present invention immediately provides a spoken greeting 220 and awaits subscriber input 230 via a VRU.

A first service available to the subscriber is traditional voice dialing of stored numbers based on a spoken command by the subscriber. The VRU analyzes 240 the subscriber request to determine if a voice dial command has been given. If so, the VRU looks up the telephone number 242 and completes the call with a connection to the PSTN 244. If desired, the VRU can also be programmed to recognize a voice dial request based on recognition of a spoken telephone number in a request, such as "call 800-555-1212."

If the subscriber request is not for voice dialing, the VRU determines whether any services have been requested 250. If not, the VRU can provide an ordinary dial tone for the subscriber. If services have been requested, the VRU analyzes the request and speaks an appropriate targeted advertisement or offer 260 from the stored database. The subscriber's response is analyzed to determine if the subscriber is interested in the advertised services 270.

The VRU then electronically provides the services to the subscriber 280. Upon an affirmative response to an ad or offer, the VRU can complete the transaction based on stored vendor and subscriber information. If the subscriber declines the offer, the VRU can provide ordinary VRU-based directory assistance in order to provide the subscriber with requested services, or can provide secondary offers based on the subscriber's response.

For example, if the subscriber says: "I want a pizza," the VRU can speak an offer from Pizza Hut. If the subscriber prefers Domino's, they can say: "No thanks, but do you have any offers from Domino's?" The VRU could then provide a Domino's offer (if available) and/or offer to connect the subscriber with the closest Domino's outlet based on the subscriber's phone number (ANI).

Although described herein with respect to particular embodiments, these are not meant to limit the scope of the invention, which is limited solely by the claims.

What is claimed is:

1. A method of providing Voice-over IP (VoIP) services triggered by an off-hook signal, comprising:
   detecting a caller off-hook signal from a device connected to a voice port of a broadband network modem;
   generating a spoken greeting to the caller in response to the detection of the caller off-hook signal;
   announcing the spoken greeting to the caller, wherein the announcement of the greeting occurs prior to dialing by the caller;
   receiving a caller response to the spoken greeting in a voice response unit (VRU) on the broadband network;
   determining at the VRU whether the caller response is indicative of a transaction request, wherein the determination that the caller response is indicative of the transaction request occurs prior to dialing by the caller and wherein the transaction request is selected from the group consisting of a request to purchase goods and a request to purchase services;
   generating at the VRU a spoken marketing offer to the caller targeted to the transaction request, wherein the offer identifies a vendor;
   announcing the marketing offer to the caller;
   collecting financial information from the caller sufficient to complete the transaction; and
   sending the financial information of the caller to the vendor upon acceptance of the marketing offer thereby completing the transaction request.

2. The method of claim 1, further comprising the VRU analyzing the caller response for a caller voice dial request and connecting the caller to a number on a PSTN in response to the caller voice dial request.

3. The method of claim 2, further comprising the VRU looking up the phone number in response to the caller voice dial request.

4. The method of claim 1, further comprising:
   the VRU analyzing a caller answer to the spoken marketing offer;
   the VRU generating an additional spoken marketing offer targeted to the caller answer; and
   completing the transaction request upon acceptance of the additional spoken marketing offer.

5. The method of claim 1 further comprising storing the collected financial information.

6. The method of claim 5, wherein the stored collected financial information comprises payment information and delivery information.

7. The method of claim 4, wherein completing the transaction request comprises the VRU using stored caller data.

8. The method of claim 7, wherein the stored caller data comprises payment information and delivery information.

9. A system for providing Voice-over IP (VoIP) services triggered by an off-hook signal, comprising:
   a broadband network connecting a broadband modem to the Internet;
   a caller device connected to a voice port of the broadband modem;

a voice response unit (VRU) connected to the broadband network;

instructions on the VRU adapted to generate a spoken greeting to a caller upon detection of the off-hook signal of the caller device;

instructions of the VRU to announce the spoken greeting prior to dialing by the caller;

instructions on the VRU adapted to receive a caller response;

instructions on the VRU adapted to analyze the caller response to determine prior to dialing by the caller whether the caller response comprises a transaction request, wherein the transaction request is selected from the group consisting of a request to purchase goods and a request to purchase services;

instructions on the VRU adapted to generate a spoken marketing offer if the caller response comprises the transaction request, wherein the spoken marketing offer is targeted to the transaction request;

instructions on the VRU to announce the marketing offer; and instructions on the VRU to collect financial information from the caller sufficient to complete the transaction: and instructions on the VRU to send the financial information of the caller to the vendor upon acceptance of the marketing offer thereby completing the transaction request.

10. The system of claim 9, further comprising the VRU obtaining the marketing offer from a database of marketing offers.

11. The system of claim 9, wherein the VRU further comprises means to detect the off-hook signal and generate the spoken greeting.

12. The system of claim 9, wherein the VRU further comprises instructions adapted to analyze the caller response for a caller voice dial request and connect the caller to a number on a PSTN in response to the caller voice dial request.

13. The system of claim 11, wherein the VRU further comprises instructions adapted to look up the phone number in response to the caller voice dial request.

14. The system of claim 9, wherein:

the VRU comprises instructions adapted to analyze a caller answer to the spoken marketing offer;

the VRU comprises instructions adapted to generate an additional spoken marketing offer targeted to the caller answer; and means to complete the transaction request upon acceptance of the additional spoken marketing offer.

15. The system of claim 9, wherein the means to complete the transaction request comprises a database of caller data to complete transactions.

16. The system of claim 15, wherein the database of caller data comprises payment information and delivery information.

17. The system of claim 14, wherein the means to complete the transaction request comprises a database of caller data.

* * * * *